H. J. GILBERT.
PULLEY.
APPLICATION FILED MAR. 11, 1920.

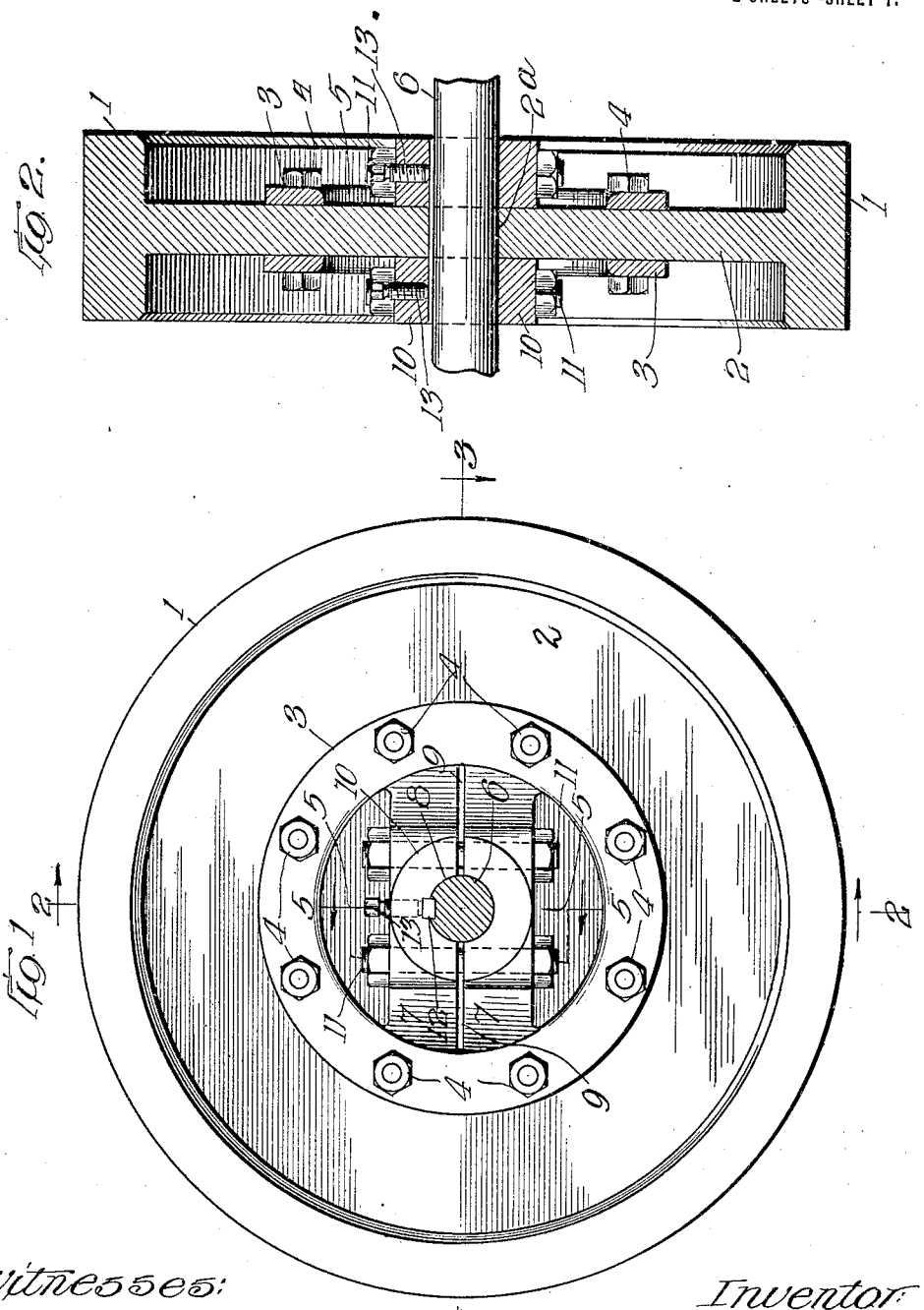

1,363,772.

Patented Dec. 28, 1920.

2 SHEETS—SHEET 2.

Witnesses
Harry B. C. White.
W. F. Kilroy

Inventor:
Henry J. Gilbert
Rector, Hibben, Davis & Macauley
By
his Attys.

UNITED STATES PATENT OFFICE.

HENRY J. GILBERT, OF SAGINAW, MICHIGAN, ASSIGNOR TO SAGINAW MANUFACTURING COMPANY, OF SAGINAW, MICHIGAN, A CORPORATION OF MICHIGAN.

PULLEY.

1,363,772.      Specification of Letters Patent.      Patented Dec. 28, 1920.

Application filed March 11, 1920. Serial No. 365,011.

*To all whom it may concern:*

Be it known that I, HENRY J. GILBERT, a citizen of the United States, residing at Saginaw, in the county of Saginaw and State of Michigan, have invented certain new and useful Improvements in Pulleys, of which the following is a specification.

My invention relates to pulleys and the object thereof is to produce a pulley of novel construction particularly as to its center, capable of withstanding the shock and vibration which are incident to certain uses of pulleys as for instance when used in connection with stamp mills and the like.

Figure 3:
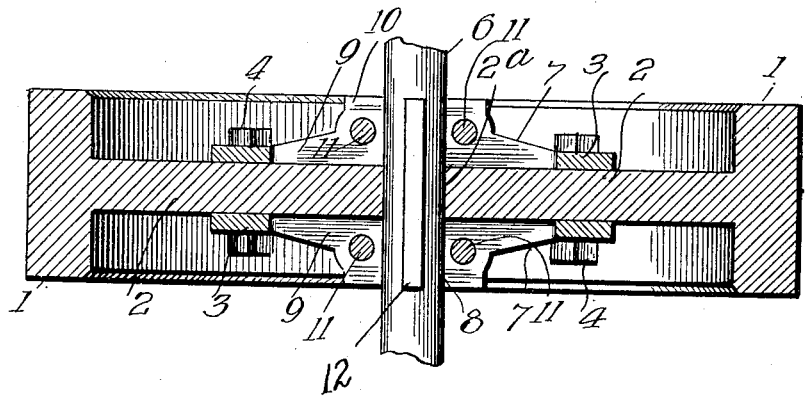
Figure 4:
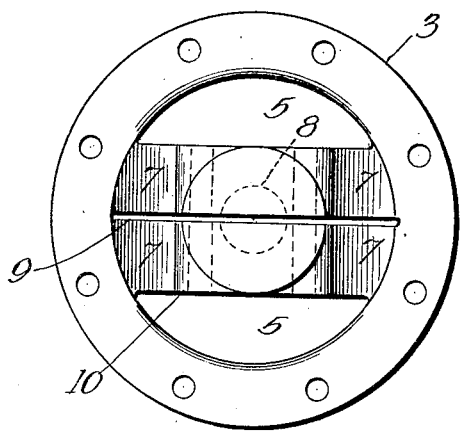
Figure 5:
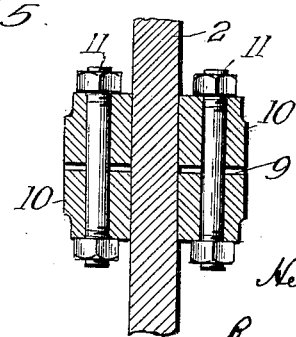

In the drawings, Figure 1 is a side elevation of a pulley embodying my invention; Figs. 2 and 3 diametric sections on the corresponding section lines of Fig. 1; Fig. 4 an elevation of one of the pulley centers detached and before the central opening has been bored; and Fig. 5 a detail section on the line 5—5 of Fig. 1.

Referring to the particular embodiment of my invention as herein shown the pulley is of the solid type comprising a rim 1, web 2 having a central opening $2^a$ accurately fitting the shaft and similar centers which are secured to opposite sides of the pulley. Each center comprises a continuous outer flange or ring 3 which is secured rigidly, as by bolts 4, to the pulley web and central clamping means which are separated on opposite sides from the flange by openings 5 and which are unconnected throughout their length with the pulley but clamped directly onto the shaft 6. The clamping means of each center consists of parallel transverse members 7 with a central opening 8 (to receive the shaft and registering with pulley opening $2^a$) and with radial slots 9. These members 7 are provided with outwardly extending bosses 10.

Before the central opening or hole 8 is bored, the opposite sides of this boss are preferably clamped together by sufficient pressure to somewhat close the slot 9, that is to say the hole is bored at the time when the center is in this clamped or compressed condition. As a result after the hole is bored and the pressure removed such hole is slightly out-of-round. The hole in its true or circular shape is exactly the diameter of the shaft 6 and the opening $2^a$ in the web of the pulley. The object of this construction is to facilitate the mounting and dismounting of the pulley.

Each center is provided with a pair of clamping bolts 11 on opposite sides of the openings 5. In addition and by preference the centers and web are secured to the shaft 6 by means of the key 12 coöperating with key-ways in the shaft and center respectively, and also with set screws 13 passing through one side of the bosses and adapted to bear against the key.

The pulley so constructed is applied to the shaft 6 and by tightening the clamping bolts 11 the centers are caused to accurately fit such shaft and to be securely clamped thereto, such centers yielding for this purpose by reason of the provision of the slots 9. The set screw 13 is also tightened up and the pulley thereby is more firmly secured to the shaft.

The opening $2^a$ for the shaft in the web of the pulley accurately fits such shaft being true centered thereon, so that the pulley is firmly supported thereby. This is of advantage particularly in case one side of the clamps of the centers should happen to be weaker than the other side, which would otherwise cause a distortion of the pulley and make it out of true center with the shaft. This condition which would be accentuated by the centrifugal action during rotation of the pulley, causing continued strain upon and distortion of the weaker side, is taken care of by this true centering and close fit of the pulley web on the shaft.

In this manner and by these means I am enabled to produce a pulley which is capable of withstanding shocks and jars incident to shafting used for driving certain kinds of machinery such as stamp mills. By reason of the peculiar construction described the centers are firmly secured to the pulley proper and such centers are themselves firmly secured to the shaft by means of the accurate clamping and the key so that there is no danger of the shearing of the key or the slipping of the pulley on the shaft.

I claim:

1. A pulley including a rim, a web and centers on opposite sides of such web, each center comprising an outer flange secured to the web and central clamping means with openings between the flange and clamping means.

2. A pulley including a rim, a web and a center and comprising an outer flange secured to the web and central clamping means, with openings between the flange and clamping means, such means having a central opening for a shaft and a slot extending diametrically of such center and partway thereacross and through such central opening.

3. A pulley including a rim, a web, and a center comprising an outer flange secured to the web, transverse clamping members with openings between them and the flange, such members having between them a central opening for a shaft and slots extending radially of such opening, and means acting at right angles to said slots for clamping said members to the shaft.

4. A pulley including a rim, a web, and a center comprising an outer flange secured to the web, transverse clamping members with openings between them and the flange, such members having between them a central opening for a shaft and slots extending radially of such opening, and clamping bolts arranged at right angles to said slots and bearing on opposite sides thereof to press such slots together and thereby clamp the center to the shaft.

5. A pulley including a rim, web and a center comprising a plate having an outer flange secured to the web, and central clamping means having a central opening for a shaft and a slot extending diametrically of the plate and partway thereacross and through such central opening, means acting at right angles to said slot for clamping such center to the shaft, in combination with such shaft, and a key between the shaft and center.

6. A pulley including a rim, web and a center comprising a plate having an outer flange secured to the web, and central clamping means having a central opening for a shaft and a slot extending diametrically of the plate and partway thereacross and through such central opening, means acting at right angles to said slot for clamping such center to the shaft, in combination with such shaft, a key between the shaft and center, and a set screw arranged in such center and adapted to bear against such key.

7. A pulley including a rim and web and a center comprising an outer flange secured to the web, and central clamping means having a central opening for a shaft, such opening being normally out-of-round but adapted to assume a round shape when clamped upon the shaft.

HENRY J. GILBERT.